(12) United States Patent
Migieu et al.

(10) Patent No.: US 7,390,037 B2
(45) Date of Patent: Jun. 24, 2008

(54) PIECE FOR PLACING AGAINST AN ELEMENT OF BODYWORK, AN ELEMENT OF BODYWORK SUITABLE FOR RECEIVING SUCH A PIECE, AND AN ASSEMBLY COMPRISING SUCH A PIECE AND SUCH AN ELEMENT OF BODYWORK

(75) Inventors: Vincent Migieu, Amberieu en Bugey (FR); Marc Verwaerde, Moras (FR)

(73) Assignee: Compagnie Plastic Omnium, Lyons (FR)

( * ) Notice: Subject to any disclaimer, the term of this patent is extended or adjusted under 35 U.S.C. 154(b) by 971 days.

(21) Appl. No.: 10/800,152

(22) Filed: Mar. 12, 2004

(65) Prior Publication Data

US 2004/0258855 A1 Dec. 23, 2004

(30) Foreign Application Priority Data

Mar. 13, 2003 (FR) .................................. 03 03135

(51) Int. Cl.
*B60R 19/02* (2006.01)
(52) U.S. Cl. ..................................... 293/102
(58) Field of Classification Search ................ 293/102, 293/155; 296/198, 29, 191, 146.15, 203.02, 296/96.21
See application file for complete search history.

(56) References Cited

U.S. PATENT DOCUMENTS

| 1,937,197 | A | * | 11/1933 | Halladay ..................... 293/102 |
| 3,895,859 | A | * | 7/1975 | Yoshida et al. .......... 296/146.15 |
| 4,364,214 | A | * | 12/1982 | Morgan et al. ............... 296/191 |
| 5,092,643 | A |   | 3/1992 | Okamoto et al. |
| 5,413,661 | A | * | 5/1995 | Spengler et al. .............. 156/515 |
| 5,848,853 | A | * | 12/1998 | Clenet .......................... 296/29 |
| 6,086,138 | A | * | 7/2000 | Xu et al. ................. 296/146.15 |
| 6,203,366 | B1 |   | 3/2001 | Muller |
| 6,347,823 | B1 | * | 2/2002 | Ozawa et al. ........... 296/203.02 |
| 6,679,545 | B1 | * | 1/2004 | Balzer et al. ........... 296/203.02 |
| 6,736,434 | B2 | * | 5/2004 | Anderson et al. ............ 293/102 |
| 2005/0087997 | A1 | * | 4/2005 | Zander et al. ................ 293/102 |
| 2005/0212318 | A1 | * | 9/2005 | Hui et al. ....................... 296/29 |
| 2006/0232093 | A1 | * | 10/2006 | Boehm et al. ............. 296/96.21 |

FOREIGN PATENT DOCUMENTS

| EP | 0 349 688 | 1/1990 |
| FR | 1 127 388 | 12/1956 |

\* cited by examiner

*Primary Examiner*—Kiran B. Patel
(74) *Attorney, Agent, or Firm*—James R. Williams

(57) ABSTRACT

The invention relates to a piece for placing against a face of a bodywork element, which element includes on said face a fastening projection made of plastics material. The piece has a fastening portion made of plastics material that is configured to form a tab which, when the piece for placing against the bodywork element is in position, extends parallel to the projection and can be secured to said projection by material melting. The invention also provides a bodywork element suitable for receiving such a piece, and an assembly constituted by the piece and the element.

6 Claims, 1 Drawing Sheet

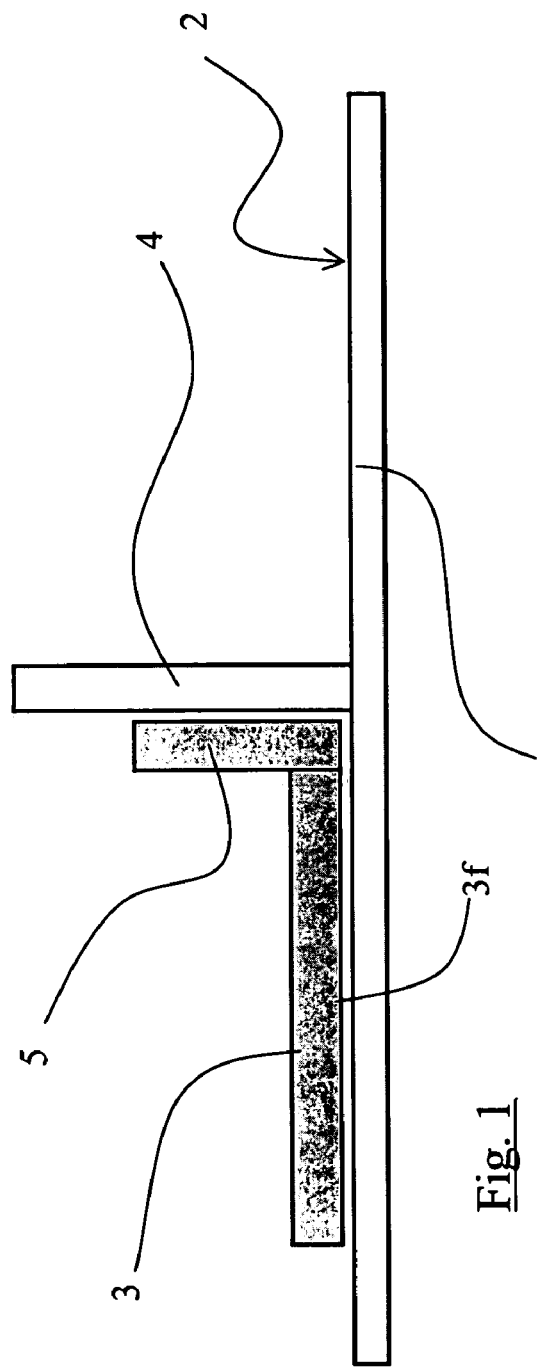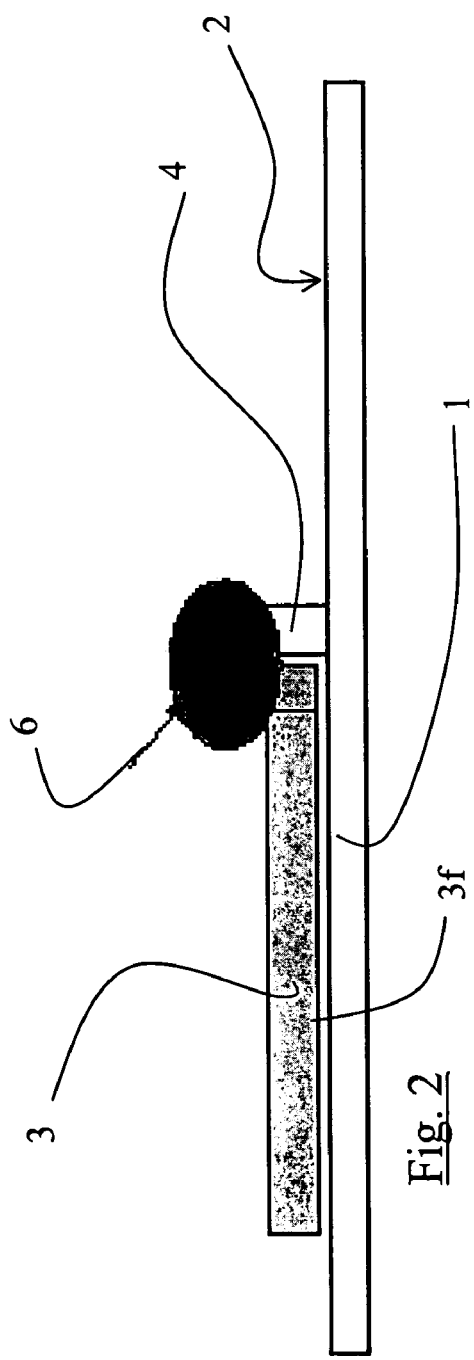

PIECE FOR PLACING AGAINST AN ELEMENT OF BODYWORK, AN ELEMENT OF BODYWORK SUITABLE FOR RECEIVING SUCH A PIECE, AND AN ASSEMBLY COMPRISING SUCH A PIECE AND SUCH AN ELEMENT OF BODYWORK

1) TECHNICAL FIELD TO WHICH THE INVENTION RELATES

The invention relates to the field of pieces for the automobile industry that include at least a portion made of plastics material.

More precisely, the invention relates to a piece for placing against an element of bodywork, to an element of bodywork suitable for receiving such a piece, and to an assembly of such a piece and such an element of bodywork.

A particular application is fixing a piece of plastics material to a bumper skin made of plastics material, said piece constituting, for example, a sensor support.

2) KNOWN STATE OF THE PRIOR ART

Various solutions have already been proposed for fixing a piece of plastics material on a bumper skin, or more generally on a another piece of plastics material used as an element of bodywork. The piece to be put into place is often a support for a functional member of the vehicle, such as a sensor, for example. It possesses a face which is to be kept parallel to the bodywork element. Known solutions make use of rivets, screws, snap-fastening, or welding.

Amongst those solutions, some preserve the outside appearance of the element supporting the piece of plastics material, in particular by avoiding any visible fastener means or heat marks.

The present invention belongs to this category of fastener means which preserve the appearance of the bodywork element receiving the plastics material part that is to be fastened thereto. The invention provides a novel alternative to prior art solutions.

3) SUMMARY OF THE INVENTION

The present invention provides a piece for placing against a face of a bodywork element, the bodywork element including on said face a fastening projection made of plastics material, said piece having a fastening portion made of plastics material configured to form a tab which, when the piece for placing against the bodywork element is in position, extends parallel to the projection and can be secured to said projection by material melting.

The term "material melting" is used to mean any method which unites the material constituting the tab to the material constituting the projection. This may comprise welding, soldering, or a chemical reaction.

Preferably, the projection formed on the face of the bodywork element is longer than the tab on the piece for placing, so as to act as a guide for positioning the piece for placing against the bodywork element.

According to other characteristics of the invention:
the bodywork element is a bumper skin;
the piece for placing is a sensor support; and
a plurality of projections formed on the bodywork element enable the piece for placing to be positioned accurately against the bodywork element.

The invention also provides a bodywork element including a fastening projection for a piece for placing against said bodywork element, wherein said projection is shaped so that when the piece is in position on the bodywork element, the projection extends parallel to a fastening tab belonging to said piece for placing.

The invention also provides an assembly constituted by the piece for placing and the bodywork element as described above.

4) BRIEF DESCRIPTION OF THE DRAWING

The invention will be better understood on reading the following description given purely by way of example and made with reference to the accompanying drawing, in which:

FIG. 1 shows a bumper skin and a portion of a sensor support; and

FIG. 2 is analogous to FIG. 1 and shows the same part after material has been melted.

5) DETAILED DESCRIPTION OF AT LEAST ONE EMBODIMENT

In the two figures, the following references are used:
1=bumper skin;
2=inside face of bumper skin;
3=part of a central support having a face $3f$ for placing against the inside face;
4=projection projecting from the inside face;
5=tab for extending parallel to the projection; the tab is smaller than the projection; and
6=melted material that has led to the material constituting the projection and the tab being mixed together.

It can be seen that the invention is not limited to the embodiment described above.

For example, in a variant, each part could be constituted in hybrid manner out of a metal portion and a portion made of plastics material, in locations suitable for enabling such a piece to be fastened to a bodywork element that may itself also be a hybrid element.

In another variant, the faces that are for placing one against the other are not plane, but possess, for example, curvature that is continuous or discontinuous.

What is claimed is:

1. A bodywork element including a fastening projection for a piece placed against the bodywork element, wherein the projection is shaped so that when the piece is in position on the bodywork element, the projection extends parallel to a fastening tab belonging to the piece.

2. A bodywork element according to claim 1, including a plurality of projections.

3. A bodywork element according to claim 1, wherein the bodywork element comprises a bumper skin.

4. The bodywork element of claim 1, wherein the bodywork element and the piece form an assembly by melting together the projection of the bodywork element and the tab of the piece.

5. The bodywork element of claim 4, wherein the projection is longer than the tab of the piece.

6. The bodywork element of claim 4, wherein the piece includes a sensor support.

* * * * *